No. 740,316. PATENTED SEPT. 29, 1903.
C. J. ROMWALL & W. C. PITT.
HAY LOADER.
APPLICATION FILED DEC. 30, 1902.
NO MODEL. 3 SHEETS—SHEET 2.

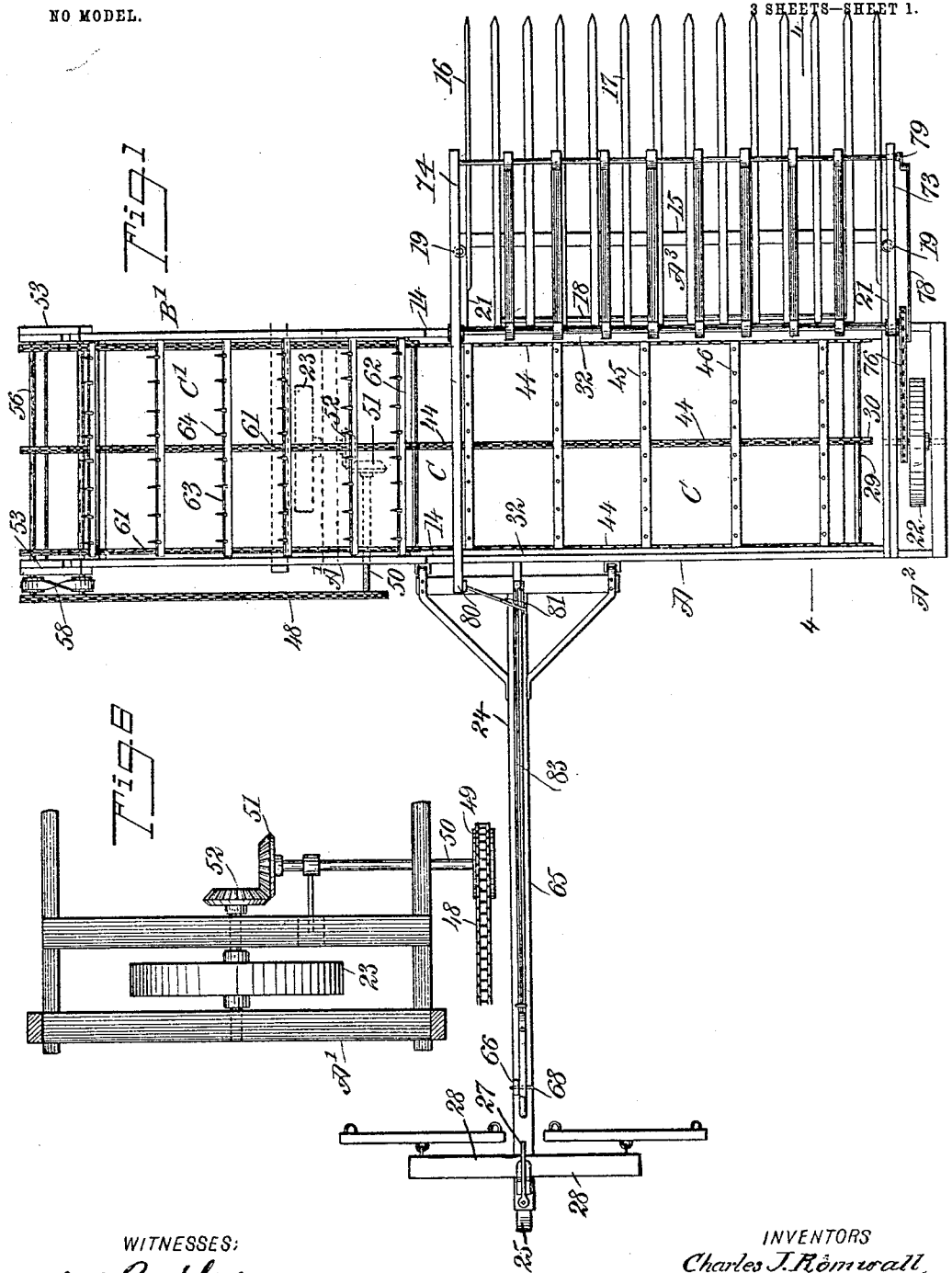

No. 740,316. PATENTED SEPT. 29, 1903.
C. J. ROMWALL & W. C. PITT.
HAY LOADER.
APPLICATION FILED DEC. 30, 1902.
NO MODEL. 3 SHEETS—SHEET 3.
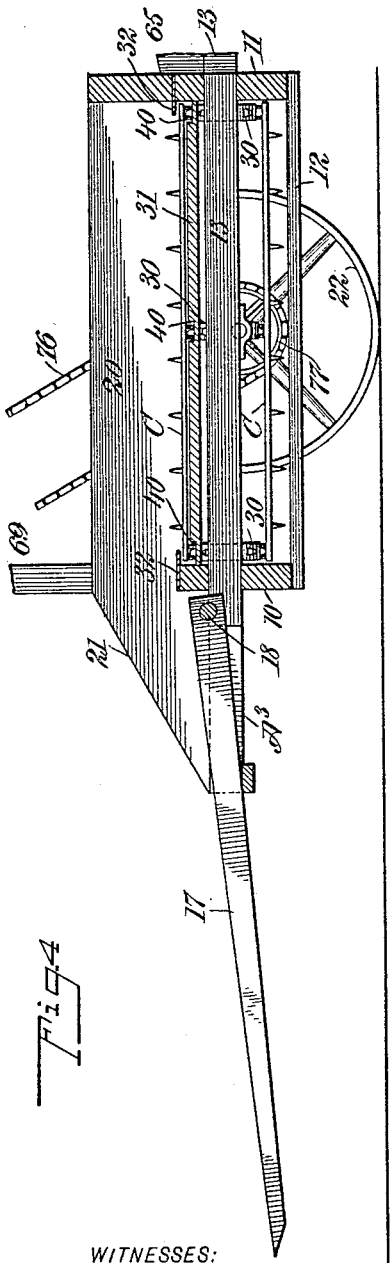
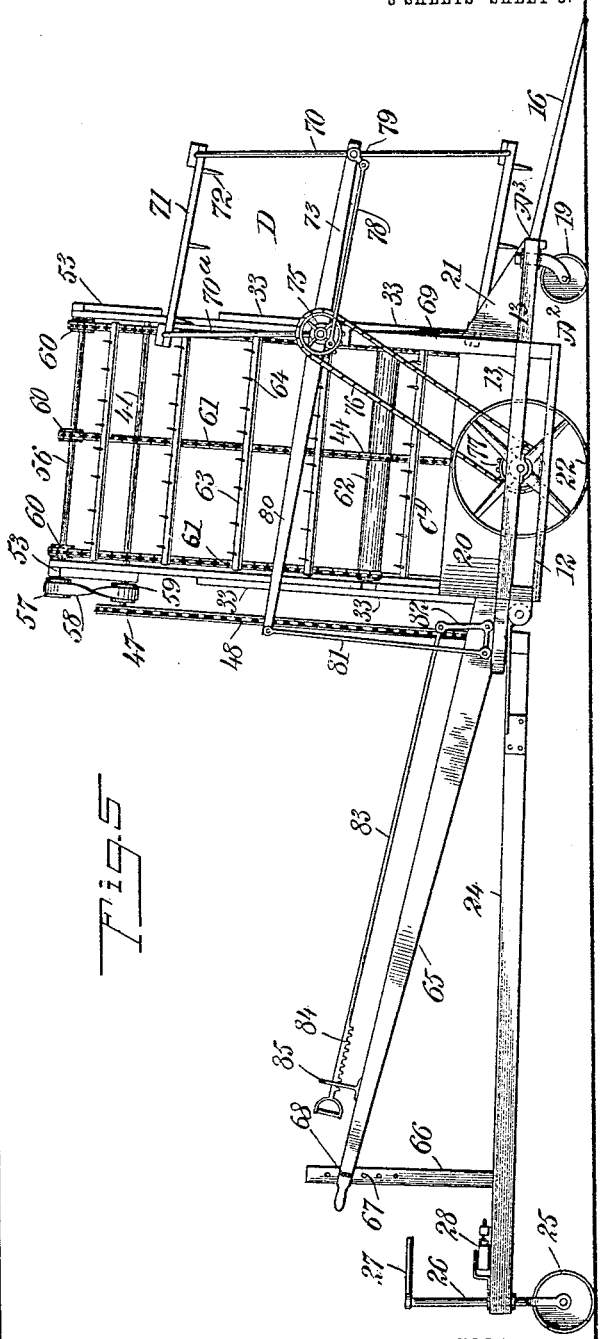
WITNESSES:
PROPRIETORS
Charles J. Romwall
William C. Pitt
BY
ATTORNEY No. 740,316. Patented September 29, 1903.

UNITED STATES PATENT OFFICE.

CHARLES JOHN ROMWALL AND WILLIAM CHARLES PITT, OF LOVELOCK, NEVADA.

HAY-LOADER.

SPECIFICATION forming part of Letters Patent No. 740,316, dated September 29, 1903.

Application filed December 30, 1902. Serial No. 137,151. (No model.)

*To all whom it may concern:*

Be it known that we, CHARLES JOHN ROMWALL and WILLIAM CHARLES PITT, citizens of the United States, and residents of Lovelock, in the county of Humboldt and State of Nevada, have invented a new and Improved Hay-Loader, of which the following is a full, clear, and exact description.

The purpose of our invention is to provide a simple, durable, economic, and effective form of hay-loader especially adapted for use on large ranches where hay in quantities is to be gathered and stacked, the device being adapted to save the expense of shocking and pitching, and, in a measure, raking the hay into wagons.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a sectional rear elevation of the same. Fig. 3 is a transverse section through the elevator, taken practically on the line 3 3 of Fig. 2. Fig. 4 is a transverse section through the body of the machine, taken practically on the line 4 4 of Fig. 1, the teeth being omitted and the forward extension of the frame being broken away. Fig. 5 is an elevation of the machine viewed from the right-hand side; and Fig. 6 is a detail sectional view of the driving mechanism for the elevator, taken substantially on the line 6 6 of Fig. 2.

The main frame A of the machine is rectangular in shape, and consists, usually, of front and rear boards 11 and 10, the rear board 11 being of greater height than the front board 10. These front and rear boards are connected at their bottom surfaces by transverse bars 12 and between their top and bottom edges by main transverse beams 13. At the left-hand end of the main frame A the transverse beams are extended outward, as at 14 in Figs. 1 and 2, to form an extension A' of the main frame at the said left-hand end, and the beams are likewise carried out beyond the right-hand end of the main frame to form a transverse extension $A^2$, as is also shown in Figs. 1 and 2.

A front extension $A^3$ is provided for the main or body frame A, as is shown in Figs. 1 and 5, and this extension consists in carrying the transverse beams 13 near the end portions of the body or main frame forwardly beyond the same and connecting the forward extensions of such beams by a front cross-bar 15.

Forwardly-extending rake-teeth 16 are attached to the inner faces of the side sections of the forward extension $A^3$ of the main frame, the said teeth extending over and beyond the front cross-bar 15, and said fixed teeth serve practically as fenders, while between the end teeth 16 any desired number of intermediate teeth 17 are located, extending forwardly over the front transverse bar 15. Preferably the intermediate teeth 17 are pivotally attached to a fixed shaft 18, secured to the bed of the machine where the front extension connects with the main frame, as is best shown in Figs. 1 and 4.

The front portion of the machine is supported by caster-wheels 19, pivotally mounted at the end portions of the front frame extension $A^3$, and at the right-hand end of the main or body frame A a board or plate 20 is vertically placed. At the same end an extension 21 of the said board is provided, which is carried forward along the right-hand end of the front extension-frame $A^3$, and usually the upper edge of the said board 21 is more or less downwardly and forwardly inclined. The main or body frame A is supported by two wheels 22 and 23, one of which is mounted to turn in the left-hand extension A', while the other is suitably mounted in the right-hand extension $A^2$, as is clearly shown in Fig. 1. These wheels are much larger than the caster-wheels 19, and consequently the frame of the machine is given a forward and downward inclination, which brings the rake-teeth 16 and 17 normally in engagement with the ground, as is shown in Fig. 5.

A pole 24 is hinged to the main frame A at its rear between its center and its left-hand end, as is shown in Fig. 1, and this pole is provided at its rear end with a steering-wheel 25, operated through the medium of an upwardly-extending shaft 26, having usually a crank-arm 27 at its upper end, and slightly in front of this steering device a draft-tree 28 is located, whereby a horse can be placed at each side of the pole 24, facing the front of the machine.

A shaft 29 is journaled transversely near the right-hand end of the main frame A, as is shown in Fig. 1, and on this shaft 29 preferably three sprocket-wheels 30 are secured in any suitable or approved manner.

A floor 31 is laid at the upper portion of the main frame A, above the transverse beams 13, as is shown in Fig. 4, and from the front and rear boards 11 and 10 horizontal shields 32 are made to extend over the side edges of the said floor.

At the outer end of the left-hand extension A' of the main frame A uprights 33 are secured in any suitable or approved manner, and between these uprights a main elevator B is located, together with an upper auxiliary elevator B'. The upper auxiliary elevator B' is of less length than the lower one, B, and both of the elevators are given an upward inclination from the left-hand end of the main frame, the inclination being more or less decided. The uprights 33 are provided with suitably-inclined braces 34, located below the lower or main elevator B, corresponding in inclination therewith. The lower elevator B consists of side pieces 37 of suitable width, transverse beams 36, connecting the said side pieces, and a floor 35, laid upon the said beams. The said floor 35 extends practically from end to end of the said elevator B and somewhat closely approaches at its lower end the left-hand end of the floor 31, laid upon the body-frame A, as is best shown in Fig. 2.

Longitudinal recesses 39 are produced in the upper face of the floor 35 of the lower elevator B, the said recesses being one centrally located and the others one at each side edge, as is shown in Fig. 3. Corresponding recesses 40 are produced in the upper surface of the floor 31 of the main frame A.

A shaft 41 is journaled at the upper end of the main elevator B, and on this shaft preferably three sprocket-wheels 42 are located, corresponding in position to the recesses 39 and 40 and the position of the sprocket-wheels 30 on the shaft 29 of the main frame. A shaft 43 is likewise journaled on the main frame A, as is shown in Fig. 2, between the two elevator-floors 31 and 35, and this shaft 43 is provided with sprocket-wheels correspondingly located to the wheels on the shafts 29 and 41. Fenders or guide-plates 32ª, corresponding to the guide-plates or fenders 32 on the body-frame A, extend inwardly from the sides of the elevator B over its floor 35. In fact, the guide plates or fenders 32 on the main frame and on the frame of the elevator B are preferably continuous and extend over the side recesses in the floors 31 and 35 of the two said parts, as is best shown in Fig. 2.

Endless chain belts 44 are passed over the sprocket-wheels 30 on the shaft 29, over the sprocket-wheels on the intermediate shaft 43, and over the sprocket-wheels on the shaft 41 at the upper end of the lower elevator B, and the chains at the side portions of the floors 31 and 35 are beneath the inwardly-extending portions of the guide-plates or fenders 32. The said endless chains travel in the recesses 39 and 40 in the two said floors 31 and 35. These endless chains 44 are connected by transverse slats 45, and each slat 45 is provided with any desired number of pins or teeth 46. In this manner a conveyer C is provided extending from the right-hand end of the main frame A to the upper end of the lower or main elevator B. This conveyer-belt receives the hay at the body portion of the machine picked up by the rake-teeth and carries the said hay upward through the elevator B to the top portion of the same, from whence it may be delivered to any suitable receptacle which may follow the machine—a vehicle, for example.

Motion is imparted to the conveyer C by locating a sprocket-wheel 47 at the rear end of the shaft 41 and passing an endless chain belt 48 over the said sprocket-wheel and over a second sprocket-wheel 49, secured to the shaft 50, journaled in the left-hand extension A' of the main frame, as shown in Figs. 2 and 6, and at the inner end of this shaft 50 a bevel-gear 51 is secured, which gear is in mesh with a similar gear 52, secured to the axle of the left-hand supporting-wheel 23. Under this construction it will be observed that as the machine advances the conveyer C is kept constantly in motion.

Uprights 53 are attached to the sides of the main elevator B at its upper end, and a shaft 56 is journaled in the upper ends of these uprights 53. On this shaft 56 the upper end of the upper or auxiliary elevator B' is pivotally mounted, its lower end being free, so that the said upper or auxiliary elevator may rest upon the material within the main elevator and assist in carrying said material upward. This upper or auxiliary elevator B' consists of side pieces 53, through which the upper shaft 56 passes, and transverse cross-beams 55, connecting the side pieces.

The shaft 56 at the upper end of the auxiliary elevator B' is driven from the shaft 41 of the lower or main elevator preferably by means of a cross-belt 58, which is passed over the pulley 57 at one end of the shaft 56 and over the pulley 59 at one end of the shaft 41, as is shown in Figs. 2 and 3. A conveyer-belt C' completes the construction of the upper elevator B', and the said conveyer-belt consists of a series of endless chain belts 61, preferably three in number, and which pass over sprocket-wheels 60 on the upper shaft 56, one of said sprocket-wheels being near each end of the shaft and the other at the center, as is shown in Fig. 5. The said endless chains 61 pass over sprocket-teeth formed, preferably, in the exterior of a roller 62, journaled at the lower end of the said auxiliary elevator B', as is shown in Figs. 2 and 5, the sprocket-teeth on the roller 62 corresponding in position to the position of the sprocket-wheels 60 on the shaft 56, and the conveyer-chains 61 of the upper elevator B' correspond in position to the conveyer-chains in the lower elevator B, as is also shown in Fig. 5. The endless chains 61 of the upper conveyer C' are connected by transverse slats 63, and each of said slats is provided with upwardly-extending teeth or pins 64.

The body of the machine may be tilted rearwardly or brought to a horizontal position, so as to carry the rake-teeth 16 and 17 off of the ground, through the medium of a lever 65, (shown best in Fig. 5,) which lever is attached at its forward end to the said main frame and extends over the tongue to a sliding engagement with a keeper-post 66, which is shown as provided with a series of apertures 67. The lever 65 is held in its adjusted position usually by passing a pin 68 through the handle portion of the lever and through one of the said apertures 67 in the said keeper-post 66.

In connection with the rake-teeth 16 and 17 and the horizontal or receiving section of the conveyer C, leading to the elevator B, we employ a reel of peculiar construction adapted to operate with a rotary reciprocating movement over the said teeth and to take the hay therefrom and direct it to the said horizontal portion of the main conveyer C. This reel D is best shown in Figs. 2 and 5, and in connection therewith two uprights 69 are provided at the end portions of the main frame A, adjacent to the point where the forward extension A³ connects with the said main frame. The reel is in two sections 70 and 70ᵃ, the section 70 being a forward section and the section 70ᵃ a rear section. These two sections are identical in construction, and each consists of a wire or rod of suitable gage bent upon itself to form a series of connected U-shaped members d, and the bow-sections of the said members of the front and back sections of the reel are pivotally connected by pitmen 71, having downwardly-extending teeth 72 secured thereto in any required number. The end U-shaped member of each section of the reel has its outer member shorter than its inner member, and each of said shorter members d' is provided with an upper crank-arm, and the crank-arms of the rear section 70ᵃ of the reel are pivoted in suitable bearings formed at the upper ends of the uprights 69.

The crank-arms of the terminal portions of the front section 70 of the reel are journaled in the forward end portions of arms 73 and 74, centrally located between the top and bottom of the U-shaped members, as is shown in Figs. 1 and 5, and these arms 73 and 74 are pivotally mounted at their rear or inner ends. At the right-hand crank-terminal of the inner section of the reel D a wheel 75 is secured, over which a belt 76 is passed. The said belt is also passed over a pulley 77 of any desired character, secured upon the axle of the right-hand supporting-wheel 22. Thus it will be observed that as the machine advances a rotary reciprocating movement is imparted to the reel, and the teeth of the reel while on their downward movement take up the hay from off the rake-teeth 16 and 17 and conduct the hay to the horizontal portion of the main conveyer C.

In order to have a uniformity of movement between the front and rear sections of the reel, we preferably employ a pitman 78, pivotally attached to the wheel 75 at one end and to a crank-arm 79, formed at the crank-terminal of the right-hand end of the front section of the reel, as is best shown in Figs. 1 and 5. The left-hand supporting-arm 74 for the forward section of the reel D extends back in the form of a handle 80 to the rear of the machine, as is shown in Figs. 1 and 5, and a link 81 is attached to the rear end of this handle 80, which link extends downward at one side of the adjusting lever or arm 65 for the body of the machine and is pivotally connected with one member of an elbow-lever 82, fulcrumed upon the said adjusting arm or lever 65, as is particularly shown in Fig. 5. A handle-bar 83 is pivotally attached to the other member of the elbow-lever 82, which handle-bar 83 extends rearwardly over the adjusting lever or arm 65 and is provided at its rear end with a hand-grip and with ratchet-teeth 84, adapted for locking engagement with a keeper 85, carried by the said adjusting arm or lever 65. Thus it will be observed that the reel D may be raised or lowered, so as to control the feed of the straw according to the mass to be taken up, and that the handle-bar 83 is convenient to the driver, being located over the adjusting arm or lever 65 for the body. It is also obvious that when the body is adjusted upward or downward by the said adjusting lever or arm 65 the adjustment of the reel will be the same and that the reel may be adjusted independently of the adjustment of the body whenever desired.

Having thus described our invention, we claim as new and desire to secure by Letters Patent—

1. In a hay-loader, a wheel-supported conveyer, rake-teeth extending forward from the conveyer, a reel mounted over the rake-teeth adjacent to the conveyer, comprising a front and a rear member in corresponding serpentine arrangement, independent pivotal supports for the ends of the said members, teeth-carrying bars pivotally connecting said members at their bow portions, a driving mechanism driven from one of the supporting-wheels, adapted to impart simultaneous rotary reciprocating motion to the reel, means for combinedly raising and lowering the rake-teeth and reel, and an elevator operating in conjunction with and forming a continuation of the conveyer, as specified.

2. In a hay-loader, a wheel-supported conveyer, rake-teeth extending forward from the conveyer, a reel mounted over the rake-teeth adjacent to the conveyer, comprising pivotally-mounted and serpentine front and rear members, teeth-carrying bars connecting the said members, a driving mechanism driven from one of the supporting-wheels and adapted to impart a rotary reciprocating motion to the reel, means for combinedly raising and lowering the rake-teeth and reel, a device for independently raising and lowering the reel, an elevator forming a continuation of the conveyer, and a driving mechanism for the conveyer and the elevator, as described.

3. In a hay-loader, a wheel-supported conveyer, rake-teeth extending forward from the conveyer, a reel located over the rake-teeth, comprising pivotally-supported front and rear members, said members being of corresponding serpentine formation, tooth-carrying bars pivotally connecting loop portions of the serpentine members, the teeth on the bars pointing downward, a driving mechanism driven from the supporting-wheel, adapted to impart rotary reciprocating motion to the reel, an adjusting-arm for the rake-teeth, and an adjusting mechanism for the reel carried by and operating independently of the adjusting-arm, as set forth.

4. In a hay-loader, a wheel-supported main frame, teeth forwardly projected from said main frame, a reel pivotally supported by the main frame above the teeth, comprising front and rear serpentine members and toothed bars connecting the members, a conveyer for a part of the main frame and located at the rear of the teeth at the front of the frame, an elevator-frame at one end of the conveyer-section of the main frame, a toothed carrying-belt extending within both the elevator and the conveyer frames, an auxiliary elevator, comprising a frame and an endless toothed belt, which auxiliary elevator is pivoted at its upper end above the main elevator-frame, being free at its lower end, means for driving the two belts from one of said supporting-wheels, and mechanism driven from the other supporting-wheel for imparting rotary reciprocating movement to the reel, an adjusting-arm for the main frame, and an adjusting device for the reel carried by the said arm and operating independently of the same, as set forth.

In testimony whereof we have signed our names to this specification in the presence of two subscribing witnesses.

CHARLES JOHN ROMWALL.
WILLIAM CHARLES PITT.

Witnesses:
EUGENE COZZENS,
J. COTTON.